United States Patent [19]

Röhm

[11] Patent Number: 4,502,703
[45] Date of Patent: Mar. 5, 1985

[54] HYDRAULIC POWER MANDREL

[76] Inventor: Günter H. Röhm, Heinrich-Röhm-Str. 50, 7297 Sontheim, Fed. Rep. of Germany

[21] Appl. No.: 370,957

[22] Filed: Apr. 22, 1982

[30] Foreign Application Priority Data

Apr. 24, 1981 [DE] Fed. Rep. of Germany ....... 3116289

[51] Int. Cl.³ .............................................. B23B 31/40
[52] U.S. Cl. ................................. 279/2 A; 242/72 B; 279/2 R
[58] Field of Search ........................ 279/4, 2 A, 2 R; 285/332; 403/5; 242/72 B, 72 R; 82/44

[56] References Cited

U.S. PATENT DOCUMENTS

| | | | |
|---|---|---|---|
| 2,630,039 | 3/1953 | Klemm | 82/44 |
| 3,032,288 | 5/1962 | Tidland | 242/72 B |
| 3,388,916 | 6/1968 | Winnen et al. | 279/2 A |
| 3,388,917 | 6/1968 | Winnen et al. | 82/44 |
| 3,507,507 | 4/1970 | Tobler et al. | 279/2 A |
| 3,908,926 | 9/1975 | Ochs et al. | 242/72 B |
| 4,030,415 | 6/1977 | Fellows | 242/72 B |
| 4,103,816 | 8/1978 | Scholtus et al. | 279/2 A X |
| 4,171,626 | 9/1979 | Yates et al. | 138/DIG. 2 |
| 4,317,577 | 2/1982 | Cameron | 279/2 A |
| 4,319,076 | 3/1982 | Piur | 285/232 X |

FOREIGN PATENT DOCUMENTS

| | | | |
|---|---|---|---|
| 986780 | 3/1965 | United Kingdom | 279/ |
| 1020512 | 2/1966 | United Kingdom | 279/4 |
| 1277096 | 6/1972 | United Kingdom | 279/2 A |
| 1307603 | 2/1973 | United Kingdom | 279/4 |

Primary Examiner—William R. Briggs
Attorney, Agent, or Firm—Karl F. Ross; Herbert Dubno

[57] ABSTRACT

A power mandrel has a mandrel body extending along, generally centered on, and adapted to be rotated about an axis. A synthetic-resin tube generally centered on the axis, having angularly extending reinforcement fibers, and having opposite ends formed with respective axially oppositely opening grooves each having one radially outwardly directed flank spacedly surrounds this body and forms with it a pressurizable compartment. Respective rings on the body axially flank the tube and having axially projecting lips fitted to the grooves and each have one face engaging radially inwardly on the respective groove flank. The body, tube, and rings together form the pressurizable compartment. Respective adhesive bonds between each of the groove flanks and the respective lip face secure the tube in place on the body. Normally the flanks and faces are complementarily frustoconical and centered on the axis.

9 Claims, 2 Drawing Figures

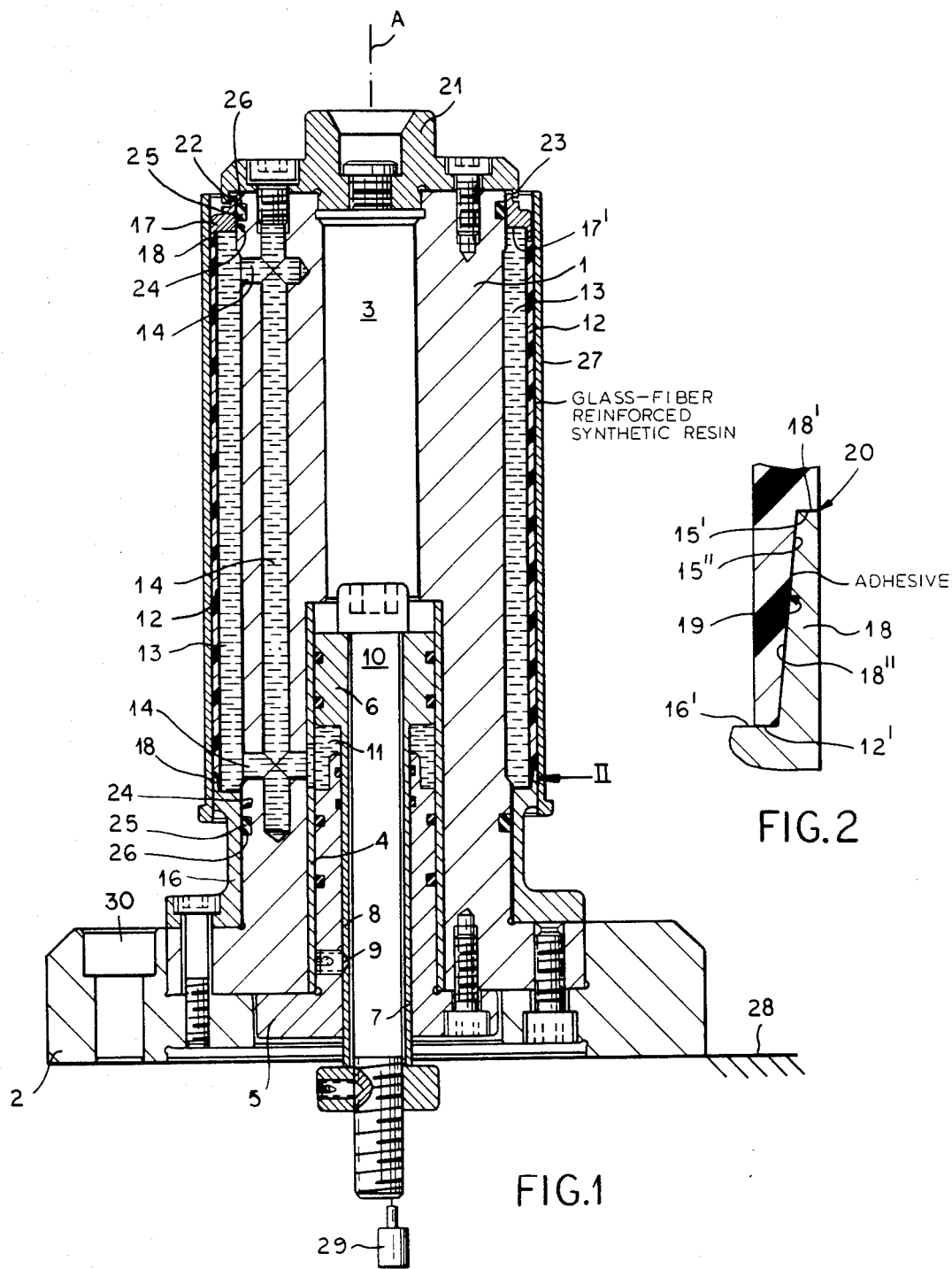

HYDRAULIC POWER MANDREL

FIELD OF THE INVENTION

The present invention relates to a hydraulic power mandrel. More particularly this invention concerns a mandrel that is engaged in a hollow or tubular workpiece while it is being rotated about an axis and machined.

BACKGROUND OF THE INVENTION

When the exterior of a tubular workpiece, or a workpiece with a central hole, must be accurately machined, such as turned down on center or finished, it is impossible to hold it in the jaws of a standard chuck of the type described in my numerous earlier patents. Instead this workpiece is fitted over a mandrel normally having a cylindrical outer surface whose diameter can be increased to radially outwardly engage the inner surfaces of the workpiece, thereby holding it tightly on center.

The original such mandrels have a plurality of segments that can be spread mechanically apart, normally by sliding them along tapered cores that can displace them radially. Such purely mechanical arrangements can occasionally deform a workpiece, in particular flattening it at the regions aligned with the axially extending joints of the mandrel.

Hence the hydraulic power mandrel was developed. This type of chuck has a body extending along and centered on an axis, and having a pair of axially spaced outwardly projecting ridges. A cylindrical steel sleeve or tube is engaged over this body, spaced from it and forming a compartment with it between the two ridges. At each of the ridges the sleeve is welded to the body to seal off the annular compartment which therefore can be pressurized to radially swell the mandrel.

Thus a workpiece having an inner diameter slightly greater than that of the mandrel can be slipped over it, whereupon the compartment is pressurized to swell the steel tube tightly radially against it. This effectively locks the workpiece to the mandrel, on center and in excellent surface contact with the entire cylindrical surface of the mandrel.

One disadvantage of such a system is that the steel sleeve is only limitedly radially elastic. Hence it must fit very snugly in the recess or bore of the workpiece if it is to work. Furthermore the weld seams between the ends of the sleeve and the body are under considerable axial stress, as the sleeve inherently shortens axially somewhat as it swells radially, and vice versa.

In order to eliminate the likelihood of failure at these weld seams, it has been suggested to replace them with O-ring joints. This does allow limited axial displacement of the sleeve and mandrel body, but makes them prone to leakage since the radially deformable sleeve will pull radially away from the ridges when the compartment is pressurized. Such leakage is particularly likely at the extremely high pressures which such an arrangement is used with.

OBJECTS OF THE INVENTION

It is therefore an object of the present invention to provide an improved power mandrel.

Another object is the provision of such a power mandrel which overcomes the above-given disadvantages.

Yet another object is to provide such a mandrel which has a long service life, and which has a relatively wide range of adjustability, that is which can swell radially through a distance equal to a greater portion of its diameter than has been hitherto possible.

SUMMARY OF THE INVENTION

These objects are attained according to the instant invention in a power mandrel having a mandrel body extending along, generally centered on, and adapted to be rotated about an axis. A synthetic-resin tube generally centered on the axis, having angularly extending reinforcement fibers, and having opposite ends formed with respective axially oppositely opening grooves each having one radially outwardly directed flank spacedly surrounds this body and forms with it a pressurizable compartment. Respective rings on the body axially flank the tube and having axially projecting lips fitted to the grooves and each have one face engaging radially inwardly on the respective groove flank. The body, tube, and rings together form the pressurizable compartment. Respective adhesive bonds between each of the groove flanks and the repective lip face secure the tube in place on the body. Normally the flanks and faces are complementarily frustoconical and centered on the axis.

With this system, therefore, the flexible synthetic-resin tube can stretch considerably more than a comparably dimensioned steel tube, while still having a long service life. The adhesive joint formed at the interfitting groove and lip will similarly be long-lived, as such connections can be quite strong, and in any case the groove-and-lip structure will spare the adhesive bond much stress.

According to another feature of this invention the flanks taper axially toward each other and the faces taper axially away from each other.

It is advantageous, in order to prevent stressing of the bonds, for one of the rings to be axially displaceable on the body. Such an arrangement has seals between the one ring and the body. Since the ring and body can be made of a rigid metal, these seals, normally O-rings, can perfectly seal the system.

In accordance with a feature of this invention the mandrel has an end sleeve on the body at the one ring and having an axially extending ridge engaging radially outside the one ring. The one ring is axially slidable on the body relative to the end sleeve in contact with the ridge.

The mandrel body of this invention is provided with an axially displaceable piston defining with the body a second compartment connected to the first-mentioned compartment. Thus axial displacement of the piston in the body pressurizes the first compartment. Such a piston can be operated by the standard actuator of a lathe headstock. In this arrangement the tube is substantially cylindrical and the compartment is annular.

The fibers according to this invention can be of glass or carbon. Either way the tube can be quite strong and have a very long service life. The outside surface of the tube can be chromed or otherwise coated for special applications.

DESCRIPTION OF THE DRAWING

The above and other features and advantages will become more readily apparent from the following, reference being made to the accompanying drawing in which:

FIG. 1 is an axial section through a power mandrel according to the present invention; and FIG. 2 is a large-scale view of a detail of FIG. 1.

SPECIFIC DESCRIPTION

As seen in FIG. 1 a power mandrel according to this invention has a body 1 centered on and extending along an axis A. This body 1 has a flange 2 formed wth holes 30 so that it can be bolted to a lathe headstock 28 provided with an internal, axially effective actuator cylinder 29, as described in my numerous earlier patents.

The body 1 is formed centered on the axis A with a stepped bore 3 in whose large-diameter inner end a tube or sleeve 4 is snugly received, with a T-section part 4 of the body 1 also centered on the axis A being fitted over the end of and into this sleeve 4 to fix it in place in the bore 3. A piston 6 is axially displaceable in the sleeve 4 and has an axially inwardly extending collar 7 formed with an axially extending slot in which engages a nut 9 screwed into the part 5. Thus the piston 6 cannot rotate inside the body 1.

A bolt 10 engaged axially through the piston 6 is coupled to the actuator 29 of the chuck shown schematically at 28. This piston 6 forms with the body 1 an inner compartment 11 filled with hydraulic fluid. When the actuator 29 moves the piston 6 axially inwardly (down in FIG. 2) the compartment 11 will be reduced in volume and pressurized, and vice versa.

A synthetic-resin tube 12 centered on the axis A and having angularly extending internal glass- or carbon-fiber reinforcement has axially opposite ends formed with axially oppositely open grooves 15 into which fit respective ridges or lips 18 of inner and outer rings 16 and 17. This tube 12 forms an annular hydraulic compartment 13 with the tube body 1, which itself is formed with passages 14 for fluid communication between the compartments 11 and 13. The ring 16 is bolted to the inner end of the body 1 and has a cylindrical inner surface 24 sealed with respect to this body 1 by means of an O-ring 25 received in a radially outwardly open groove 26 of the body. The ring 17 is limited axially slidable on the outer end of the body 1 and similarly has a cylindrical inner surface 24 sealed on the body 1 by an O-ring 25. The outer end of this body 1 is provided with an end cap 21 having a cylindrical rim or lip 2 that engages over a similar such rim or lip 22 formed on the upper side of the ring 17, with the lip 23 radially outside and telescoping with the lip 22. There is limited axial play between the parts 21 and 17 so that this ring 17 can move axially through a relatively short distance on the body 1.

As also shown in FIG. 2 each of the grooves 15 has an annular face 15′ which lies in a plane perpendicular to the axis A, and a frustoconical surface 15″ which is centered on this axis A. The lip 18 has complementary surfaces 18′ and 18″ that flatly engage the surfaces 15′ and 15″. A layer 19 of a suitable adhesive is provided between the two faces 15″ and 18″ to secure the sleeve in place 12, which action is enhanced by the ability to clamp it axially between the rings 16 and 17. End surfaces 12′ of the tube 12 which lie perpendicular to the axis A thereof engage flatly against complementary surfaces 16′ an 17′ of the rings 16 and 17, so that the entire assembly is tightly held together.

In use a workpiece such as the tube shown at 27 is fitted over the entire assembly, whose compartments 11 and 13 are not pressurized. Then the actuator 29 is operated to pull the piston 6 axially down, thereby pressurizing the compartments 11 and 13 and radially expanding the tube 12 into excellent radial surface contact with the inside surface of this workpiece 27. As the tube 12 expands radially the ring 17 will pull down slightly away from the end cap 21, without any leakage however since the O-rings 25 can easily withstand the pressures.

With this arrangment the tube 12 is made of a synthetic resin which has limited elastic flexibility. The rings 16 and 17 and the end cap 21 are made of steel. The rest of the assembly, except for the sleeve 4 and normally the piston 6, can be made of cast aluminum. The hard metallic surfaces are sealed with respect to each other by the O-rings 25, and the glue joint 19 seals perfectly between the more flexible tube 12 and its rings 16 and 17. Thus there is virtually no likelihood of leakage from this device.

I claim:

1. A power mandrel for a tubular workpiece, the mandrel comprising:
   a mandrel body extending along, generally centered on, and adapted to be rotated about an axis;
   a synthetic-resin tube generally centered on said axis, fittable within the tubular workpiece, having angularly extending reinforcement fibers, and having opposite ends formed with respective axially oppositely opening grooves each having one radially outwardly directed flank;
   respective rings on said body axially flanking said tube and having axially projecting lips fitted to said grooves and each having one face engaging radially inward on the respective groove flank, said body, tube, and rings together forming a pressurizable compartment, one of said rings being axially slidable on said body and means on said body to limit movement of said ring;
   respective adhesive bonds between each of said groove flanks and the respective lip face; and
   means for pressurizing said compartment and thereby swelling said tube into direct surface engagement with the tubular workpiece it is within.

2. The power mandrel defined in claim 1 wherein said flanks and faces are complementarily frustoconical and centered on said axis.

3. The power mandrel defined in claim 2 wherein said flanks taper axially away from each other and said faces taper axially toward each other.

4. The power mandrel defined in claim 1 wherein said compartment is annular and bounded axially by said rings.

5. The power mandrel defined in claim 1, further comprising seals between said one ring and said body.

6. The power mandrel defined in claim 1, further comprising an end sleeve on said body at said one ring and having an axially extending ridge engaging radially outside said one ring, said one ring being axially slidable on said body relative to said end sleeve in contact with said ridge.

7. The power mandrel defined in claim 1 wherein said body is provided with an axially displaceable piston defining with said body a second compartment connected to the first-mentioned compartment and forming said means, whereby axial displacement of said piston in said body pressurizes said first compartment.

8. The power mandrel defined in claim 1 wherein said tube is substantially cylindrical and said compartment is annular.

9. The power mandrel defined in claim 1 wherein said fibers are carbon.

* * * * *